O. JUSTUS.
AUTOMATIC GAS DRIP.
APPLICATION FILED AUG. 23, 1910.
974,889.
Patented Nov. 8, 1910.
2 SHEETS—SHEET 1.
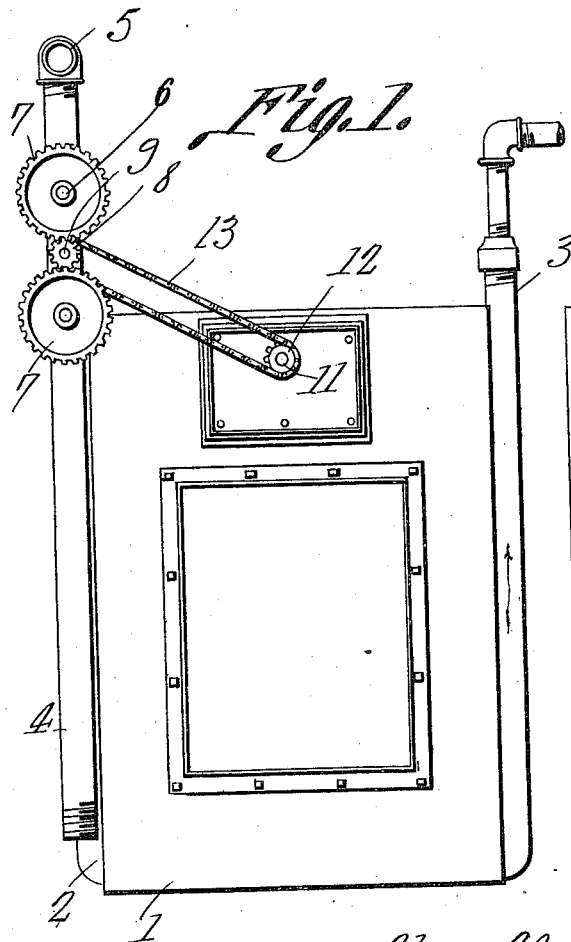
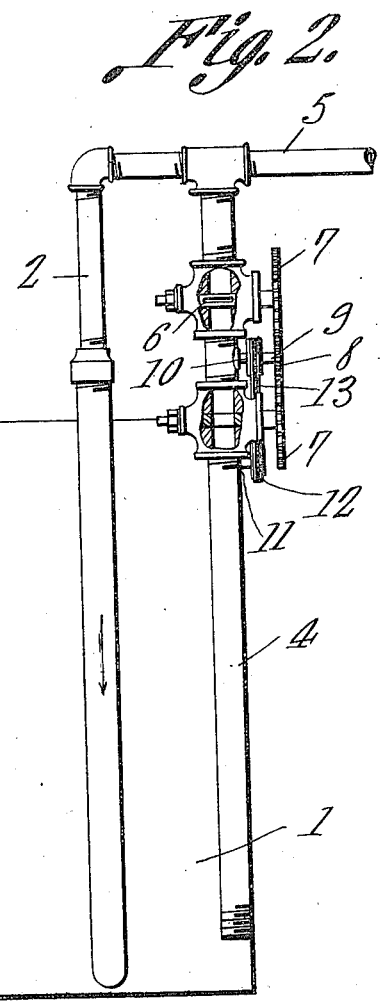
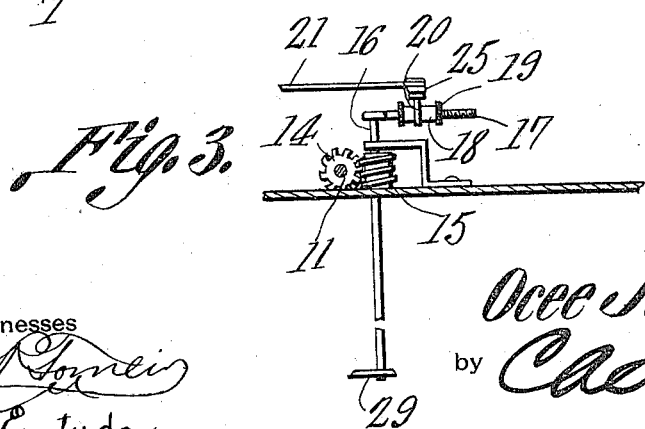
Witnesses
Ocee Justus Inventor
by
Attorneys

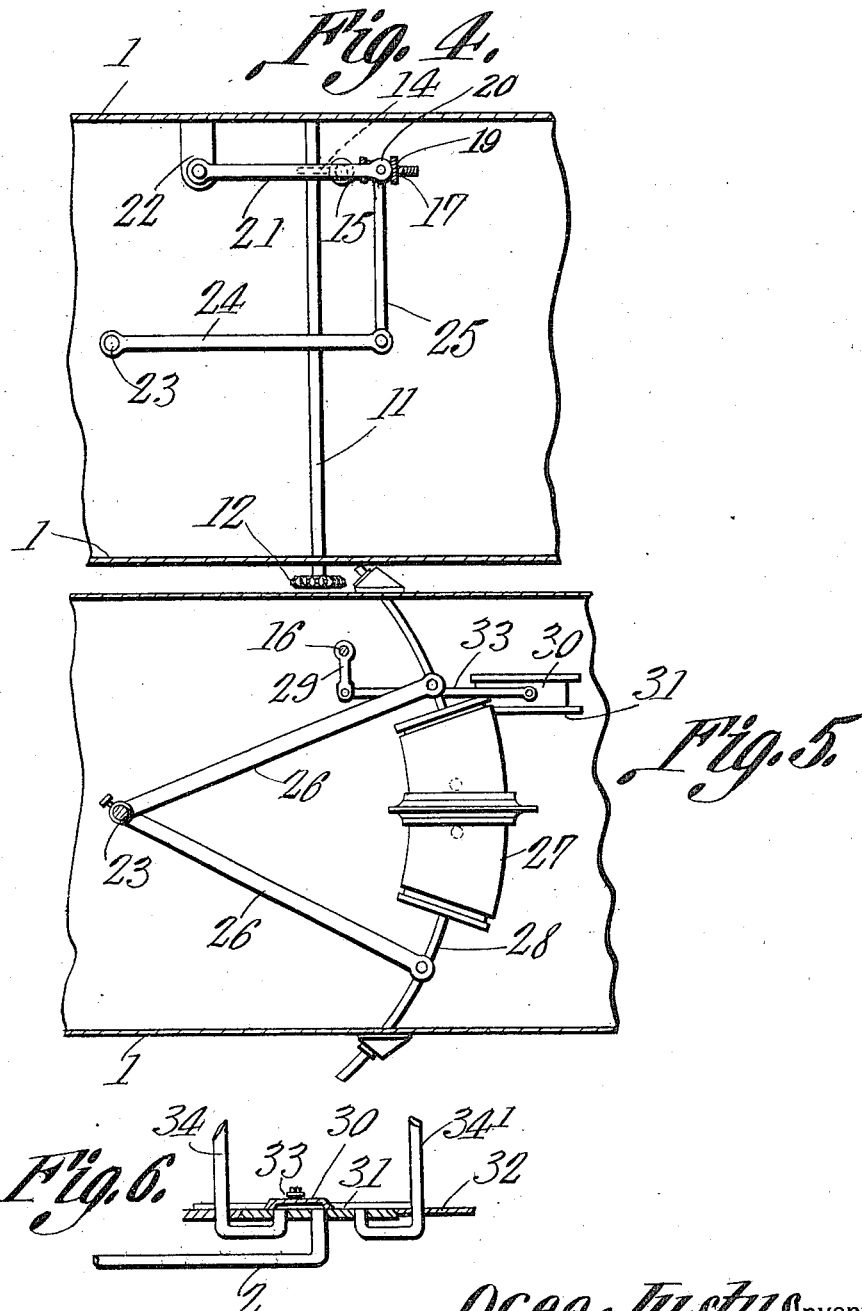

UNITED STATES PATENT OFFICE.

OCEE JUSTUS, OF CLARKSBURG, WEST VIRGINIA.

AUTOMATIC GAS-DRIP.

974,889.

Specification of Letters Patent. Patented Nov. 8, 1910.

Application filed August 23, 1910. Serial No. 578,509.

*To all whom it may concern:*

Be it known that I, OCEE JUSTUS, a citizen of the United States, residing at Clarksburg, in the county of Harrison and State of West Virginia, have invented a new and useful Automatic Gas-Drip, of which the following is a specification.

This invention relates to apparatus adapted to automatically relieve flowing gas of drip or moisture and it consists in the novel construction and arrangement of its parts as hereinafter shown, described and claimed.

The object of the invention is to provide a simple apparatus adapted to be applied to the pipe line and which is automatically operated by the gas under pressure passing through the said line to relieve the said gas of drip incident to condensation or other cause of accumulation in the said pipe line.

In the accompanying drawings: Figure 1 is a front elevation of the apparatus. Fig. 2 is a side elevation of the same. Fig. 3 is a side elevation of parts of the apparatus employed to operate a rocker shaft used in the same. Fig. 4 is a top plan view of parts of the apparatus used to operate the rocker shaft. Fig. 5 is a plan view of cylinders employed in the apparatus for utilizing the pressure of the gas to actuate the apparatus. Fig. 6 is a sectional view of a valve mechanism employed in the apparatus for controlling the flow of gas to the cylinders.

The apparatus includes a casing 1 to one side of which is connected an inlet pipe 2 and with another side of which is connected a service pipe 3. A drip pipe 4 depends from a horizontal section 5 of the inlet pipe 2 and is provided at points below the section 5 with spaced valves 6. The stems of the valves 6 are provided with gear wheels 7 which mesh with a gear wheel 8 fixed to a stud 9 which is journaled for rotation upon the pipe section 4 at a point between the valves 6. A sprocket wheel 10 is fixed to the intermediate portion of the stud 9 and a shaft 11 is journaled in the casing 1 and one end thereof projects beyond the side of the said casing. A sprocket wheel 12 is fixed to the projecting end portion of the shaft 11 and a sprocket chain 13 passes around the sprocket wheels 10 and 12 and is adapted to transmit rotary movement from the shaft 11 to the stud 9 in a manner as will be hereinafter explained whereby the said stud is turned and through the gear wheel 8 carried thereby the gear wheels 7 are partially rotated and the valves 6 are opened and closed at proper intervals. The valves 6 are so arranged that when one of the said valves is closed, the other valve is open and vice versa as indicated in Fig. 2 of the drawing. Therefore it will be seen that as the gas flows through the inlet pipe 2 and the section 5 thereof any drip or moisture which is carried by the said gas will pass down from the section 5 into the upper end of the drip section 4. The drip will settle first upon the uppermost valve 6 and when the said valve is open the drip will pass down through the same into that portion of the drip pipe 4 which is located between the said valves 6. At this time the lower valve 6 is closed and consequently none of the gas is permitted to escape through the drip pipe 4. When the lowermost valve 6 opens the upper valve closes as heretofore described and consequently the drip which was received into the section of the pipe 4 located between the valves 6 is permitted to pass down through the lowermost valve and out at the lower end of the said drip pipe 4.

In case the gas that passes through the apparatus is of a hydrocarbon nature the drip may be recovered and again utilized in the manufacture of gas and thus effect a saving. The shaft 11 is provided at a point within the casing 1 with a worm wheel 14 which meshes with a worm 15 fixed to a shaft 16 which is journaled within the said casing. A crank arm 17 is fixed to the upper end of the shaft 16 and a sleeve 18 is adjustably mounted upon the said crank arm 17 and is held in an adjusted position by means of jam-nuts 19 which are screw threaded upon the said arm 17 and bear at their sides against the ends of the said sleeve. An eye 20 receives the sleeve 18 and is slidably mounted thereon and a link 21 is pivotally connected at one end with the said eye 20 and at its other end is pivotally connected with a bracket arm 22 which is supported at the side of the casing 1 as illustrated in Fig. 4. A shaft 23 is also journaled in the casing 1 and is provided at its upper end with a crank arm 24. A link 25 is pivotally connected at one end with the end of the crank arm 24 and at its other end is pivotally connected with the eye 20. Arms 26 are secured to the lower portion of the shaft 23 and pressure cylinders 27 are located in the casing 1 and have their piston rods 28 pivotally connected with the ends of the arms 26.

A valve mechanism is provided for admitting the gas under pressure alternately to the cylinders 27 and the said valve mechanism is operated from the shaft 16 in a manner as will now be explained. A crank arm 29 is fixed to the lower portion of the shaft 16 and a sliding valve 30 is mounted between guides 31 located upon a partition 32 which in turn is located in the lower portion of the casing 1. A connecting rod 33 is pivotally attached at one end with the valve 30 and at its other end with the outer end portion of the crank arm 29. One end of the inlet pipe 2 passes into the casing 1 and extends up through the partition 32 and is located at a point approximately midway between the ends of the guides 31. A combined inlet and exhaust pipe 34 is connected at one end to one of the pressure cylinders 27 and its other end portion, passing through the partition 32, has an inlet and an outlet located therein adjacent the point of connection of the inlet pipe 2, with the said partition. In a similar manner a combined inlet and exhaust pipe 34' connects with the other pressure cylinder 27 and is also led down through the partition 32 in the casing 1 and has an outlet and inlet in the said partition 32 adjacent the end of the pipe 2 connected with the said partition. The service pipe 3 hereinbefore referred to connects with the casing 1 at a point above the partition 32 in the said casing.

The valve 30 is of such length that it may bridge the space between the discharge end of the pipe 2 and the adjacent end of either the pipe 34 or 34' and as the said valve 30 is channeled out upon its under surface it is adapted to lead the gas from the said pipe 2 to either the pipe 34 or 34' according to its position. Presuming that the gas after having passed over the drip pipe 4 and having been relieved of the drip passes down through the pipe 2 and enters the lower portion of the casing 1 the said gas then passes under the valve 30 and up through the pipe 34 or the pipe 34' according to the position of the valve 30. From the pipe 34 or 34' the gas will enter one of the pressure cylinders 27 and operate the piston therein whereby the piston rod 28 of that cylinder which is subjected to the gas pressure will be moved in an outward direction. In response to the outward movement upon the part of the piston rod 28 as described the arms 26 will be swung about the axis of the shaft 23 and as the said arms are fixed to the said shaft, the said shaft will be rocked and the arm 26 other than that last above referred to will be moved toward the cylinder in which the piston rod to which it is attached operates. Thus as the piston rod of one of the cylinders moves in an outward direction the piston rod of the other cylinder moves in an inward direction and vice versa.

From the shaft 23 movement is transmitted to the crank arm 24 and link 25 to the link 21 which in turn will rock upon its pivot whereby the crank arm 17 is swung about the axis of the shaft 16 and as the said shaft 16 is partially rotated the worm 15 in mesh with the worm wheel 14 will rock the shaft 11 and thus movement is transmitted to the gear wheel 12 which as hereinbefore described is transmitted through the connecting chain 13 to the stud 9 and its attachment. At the same time that the shaft 16 is run in the manner as above described, the arm 29 carried at the lower end thereof is swung about the axis of the said shaft and through the connecting rod 33 the valve 30 is reciprocated between the guides 31 and thus the said valve moves from a position over the inner end of the pipe 2 and for instance the end of the pipe 34 to a position over the inner end of the pipe 2 and the end of the pipe 34'. Therefore the gas under pressure is admitted to the pressure cylinders 27 alternately and when one of the cylinders 27 is subjected to gas pressure the other cylinder is exhausting through the same pipe which has been previously used to convey the gas to the same. The gas as it passes from the pipes 34 and 34' and has performed the work of operating the pistons in the cylinders 27 is liberated in the casing 1 above the partition 32 and may pass from the said casing through the service pipe 3 and may be led to any desired point.

Having described the invention what I claim as new and desire to secure by Letters Patent is:

1. An apparatus for automatically removing the drip from gas comprising a pipe through which the gas passes, a drip pipe connected with the first mentioned pipe, spaced valves located in the drip pipe and operatively connected together whereby one valve opens, the other valve closes and vice versa, a casing with which the first mentioned pipe connects and into which it discharges, a service pipe connected with said casing, pressure cylinders located in the casing, means for alternately passing the gas from the first mentioned pipe to the said pressure cylinders, means located within the casing and operatively connected with the pressure cylinders and adapted to transmit movement to the said valves, the said means also being operatively connected with the means for alternately connecting the pressure cylinders with the first mentioned pipe.

2. An apparatus for automatically removing drip from gas comprising a pipe through which the gas passes, a drip pipe connected with the first mentioned pipe, spaced valves located in the drip pipe and operatively connected together whereby one valve closes as the other valve opens, and vice versa, a casing with which the first mentioned pipe connects and into which it discharges, a service pipe connected with said casing, pressure cylinders located within the casing, means for alternately passing the gas from the first mentioned pipe to the said pressure cylinders, means located within the casing and operatively connected with the pressure cylinders and adapted to transmit movement to the valves, said means including a rock shaft which is operatively connected at one end portion with the said valves and operatively connected at another portion with the means for alternately conveying the gas to the pressure cylinders.

In testimony that I claim the foregoing as my own, I have hereto affixed my signature in the presence of two witnesses.

OCEE JUSTUS.

Witnesses:
W. L. HUMES,
H. W. WILLIAMS.